United States Patent [19]

Tsuji et al.

[11] 4,240,698
[45] Dec. 23, 1980

[54] LARGE APERTURE ZOOM LENS

[75] Inventors: Sadahiko Tsuji, Yokohama; Yasuhisa Sato, Kawasaki, both of Japan

[73] Assignee: Canon Kabushiki Kaisha, Tokyo, Japan

[21] Appl. No.: 925,299

[22] Filed: Jul. 17, 1978

[30] Foreign Application Priority Data

Jul. 22, 1977 [JP] Japan .................................. 52-88038

[51] Int. Cl.³ .............................................. G02B 15/18
[52] U.S. Cl. .................................................... 350/184
[58] Field of Search ................. 350/184, 186, 176, 212

[56] References Cited

U.S. PATENT DOCUMENTS

| 3,512,872 | 5/1970 | Lynch et al. | 350/212 X |
| 3,918,798 | 11/1975 | Takano | 350/186 |
| 3,997,244 | 12/1976 | Takano | 350/184 |
| 4,066,340 | 1/1978 | Besenmatter et al. | 350/176 X |

FOREIGN PATENT DOCUMENTS

4625779 7/1971 Japan ........................................ 350/184

*Primary Examiner*—Paul A. Sacher
*Attorney, Agent, or Firm*—Toren, McGeady and Stanger

[57] ABSTRACT

The present invention relates to a large aperture zoom lens consisting of a positive focusing lens group, a negative variator, a negative compensator, an afocal lens group and an image forming lens in sequence from the object. The focusing lens group consists of a negative meniscus lens whose convex surface is directed toward the object, a bi-convex lens and a positive meniscus lens whose convex surface is directed toward the object, the variator of a negative meniscus lens whose convex surface is directed toward the object, the bi-concave lens and a positive lens cemented with each other, the compensator representing a negative lens of a bi-concave lens and a lens cemented with each other, the negative meniscus lens in the focusing lens group is distant from the bi-convex lens so as to form are air lens with weak divergence and the compensator is moved forwards and backwards at the same time with the movement of the variator for zooming.

4 Claims, 12 Drawing Figures

FIG.3
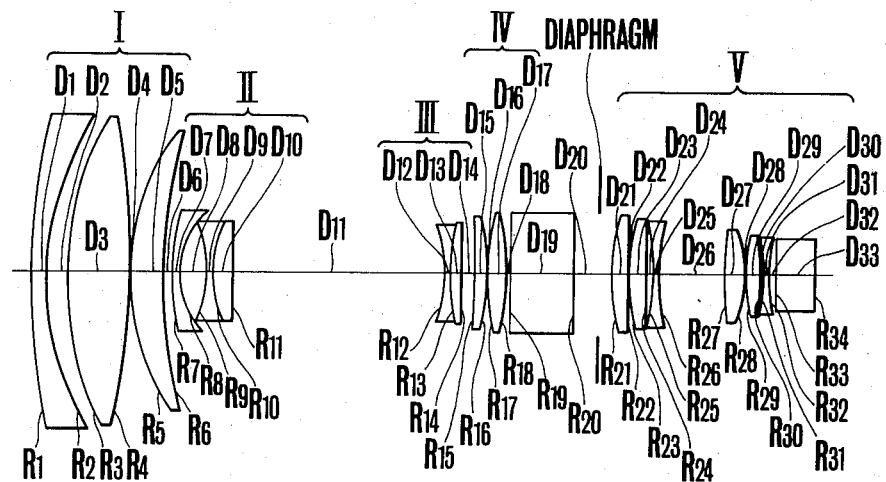
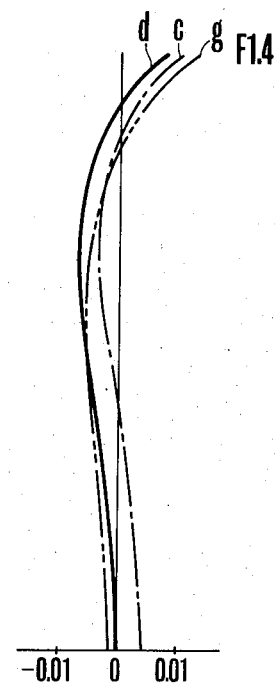
FIG.4A
SPHERICAL ABERRATION
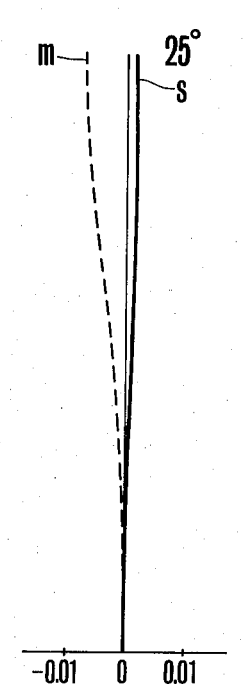
FIG.4B
ASTIGMATISM CURVATURE OF IMAGE FIELD
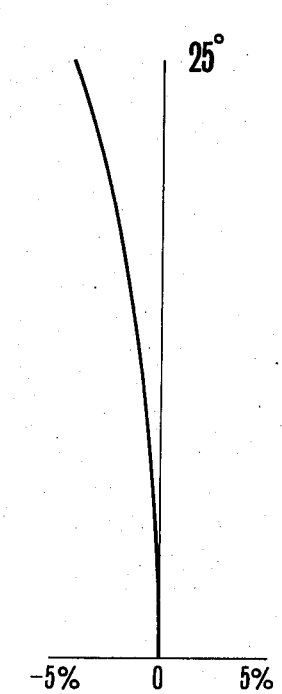
FIG.4C
DISTORTION

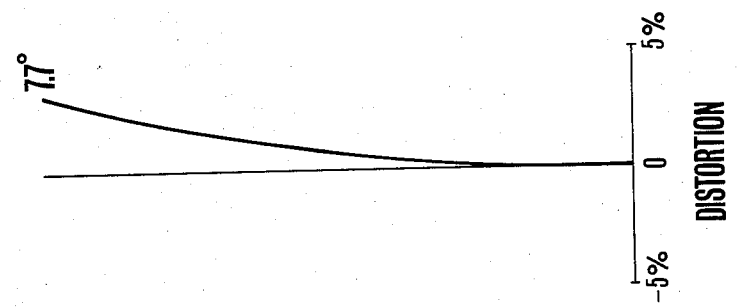
FIG.5C
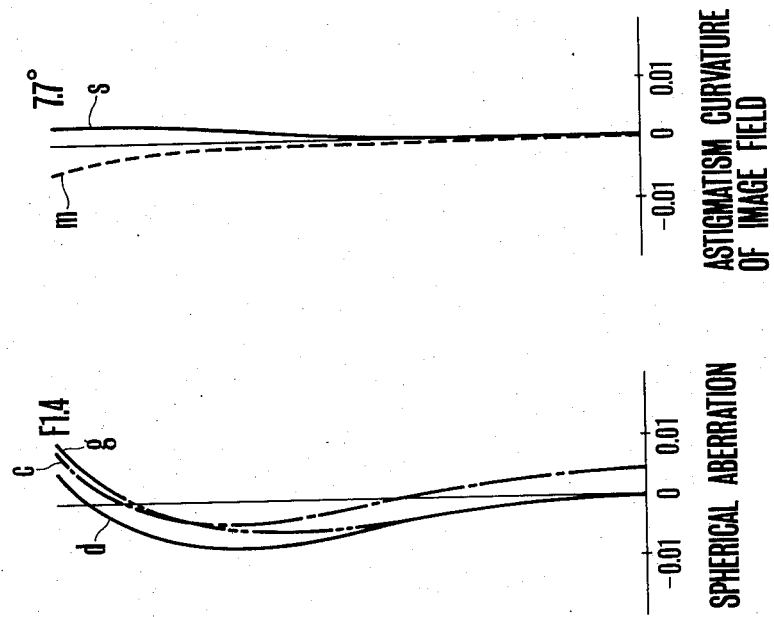
FIG.5B
FIG.5A

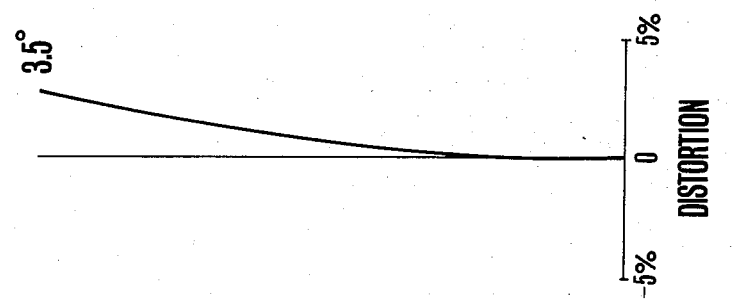
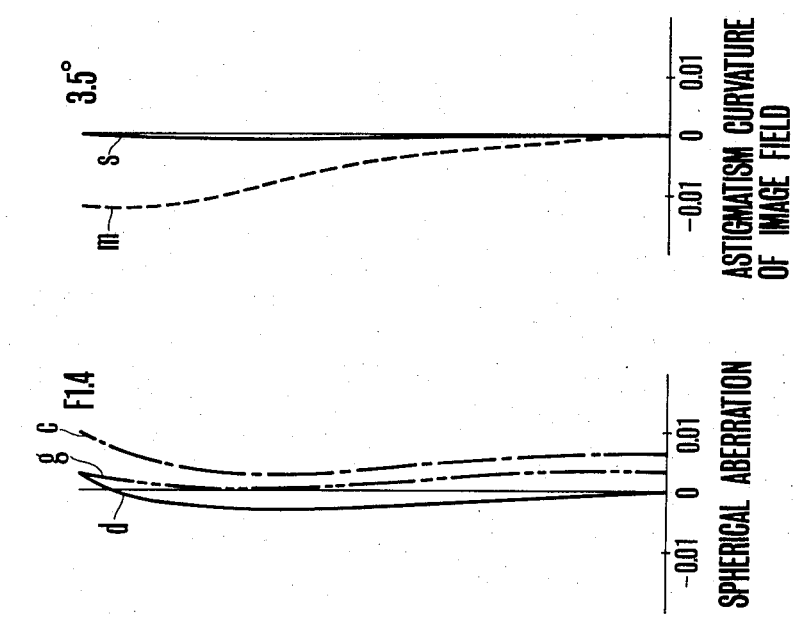

LARGE APERTURE ZOOM LENS

BACKGROUND OF THE INVENTION

The present invention relates to a zoom lens with large aperture and large zooming ratio.

Quite recently, zoom lenses with large aperture and large zooming ratio for 8 mm motion picture camera are being more and more used, whereby those lenses are generally designed in order to take pictures of bright objects principally out of doors.

On the other hand, however, along with the increase of the film sensitivity a camera which can take pictures under weak light in the room at night has also come to be used, which is the generally called XL cameras.

Hereby, it is desirable that the lens to be mounted on this kind of camera should have an efficiency proper for taking pictures of dark objects. The reason is that when a bright object is photographed the diaphragm in the lens is considerably closed, while when a dark object is photographed the diaphragm is nearly totally opened.

Hereby, it is well known that the efficiency of a lens more or less varies in accordance with the aperture value so that the lens is designed to have the best efficiency for the brightness with which pictures are taken most. Namely, the efficiency of the lens designed to have the best efficiency for bright objects somewhat goes down when pictures are taken with nearly totally opened diaphragm.

On the other hand, the focusing lens group of the zoom lens for a motion picture camera of small size is normally constituted of two positive lenses, one of which consists of a positive and a negative lens cemented with each other for preventing chromatic aberration. Hereby the cemented lens is so designed that there exists a difference between the refractive indices of the component lenses so as to prevent a divergent effect in order to check the spherical aberration of the first group in such a manner that there takes place little variation of the aberration during the zooming. Further it is already known that the two component lenses are separated from each other so as to form an air space between themselves in order to highly compensate the aberration by means of the space.

SUMMARY OF THE INVENTION

A purpose of the present invention is to improve the quality of pictures taken with nearly totally opened diaphragm.

Another purpose of the present invention is to effectively compensate the spherical aberration taking place in the focusing lens group and check the increase of the diameter of the first lens group, by arranging a comparatively large space between the negative meniscus lens and the positive lens in the focusing lens group.

The arrangement for realizing the above purposes is so designed that in sequence from the object the first group includes a lens group with a positive refractive power movable along the optical axis for focusing and consisting of a negative meniscus lens whose convex surface is directed to the object, followed by a bi-convex lens and a positive meniscus lens whose convex lens is directed toward the object. The second group includes a lens group with a negative refractive power movable for multiplication variation. The third group includes a lens group with a negative refractive power for compensation of the displacement of the image plane movable at the same time with the second group. The basic group of a lens group with a positive refractive power, whereby at least more than one of the relations are satisfied:

$$0.9 < \frac{R2}{R3} < 1 \quad (1)$$
$$0.04 F1 < D2 < 0.06 F1 \quad (2)$$
$$0.6 F1 < R5 < 0.7 F1 \quad (3)$$
$$3 |F2| < R7 < 4 |F2| \quad (4)$$
$$0.1 < N1 - \frac{N2 + N3}{2} < 0.2 \text{ and} \quad (5)$$
$$25 < \frac{\nu 2 + \nu 3}{2} - \nu 1 < 40 \quad (6)$$

In these relations, R2 represents the radius of curvature of the image side surface of the negative meniscus lens in the first group, R3 the radius of curvature of the object side surface of the bi-convex lens in the first group, D2 the distance between the negative meniscus lens and the bi-convex lens in the first group along the optical axis, R5 the radius of curvature of the object side surface of the positive meniscus lens in the first group, R7 the radius of curvature of the first surface convex to the object in the second group, N1 and $\nu 1$ the refractive power and the Abbe number of the negative meniscus lens in the first group with reference to the d line, N2 and $\nu 2$ the refractive power and the Abbe number of the bi-convex lens in the first group with reference to the d line, N3 and $\nu 3$ the refractive power and the Abbe number of the positive meniscus lens in the first group with reference to the d line, F1 the focal length of the first group and F2 the focal length of the second group.

BRIEF DESCRIPTION OF THE DRAWINGS

FIG. 3 shows the third embodiment of the lens in accordance with the present invention in section.

FIGS. 4A–4C respectively show an aberration at the end of the wide angle side of the first embodiment.

FIGS. 5A–5C respectively show an aberration in the middle picture angle.

FIGS. 6A–6C respectively show an aberration at the end of the telephoto side.

DESCRIPTION OF THE PREFERRED EMBODIMENTS

Figure 1:
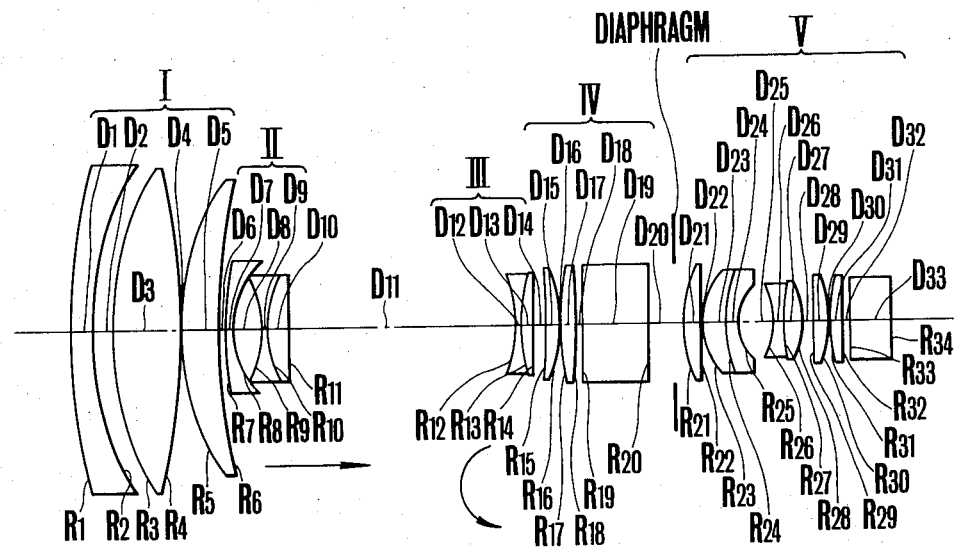
FIG. 1 shows the first embodiment of the lens in accordance with the present invention in section.
Figure 2:
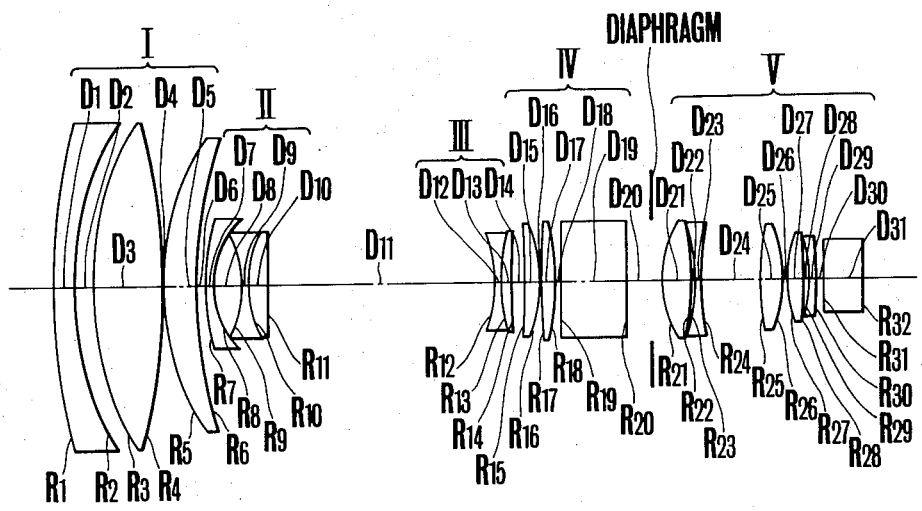
FIG. 2 shows the second embodiment of the lens in accordance with the present invention in section.

With reference to the lens arrangement in the first, the second, the third and the last group of each embodiment shown in FIGS. 1, 2 and 3, I is the first group, II is the second group, III is the third group and IV and V are the basic groups, whereby the second group moves along the optical axis for varying the magnification, the third group is once advanced toward the object to be photographed and retracted for compensating the image plane. The second group II is a negative lens consisting of a negative meniscus lens whose convex surface is directed toward the object, a bi-concave lens and a positive lens cemented with each other in sequence, the third group III is a negative lens consisting of a bi-concave lens and a positive lens cemented in sequence and the fourth group IV consists of two positive lenses, whereby the first, the second, the third and the fourth group constitute an afocal system. Further, the fifth group V is an image forming lens group focused at an infinite distance. Between the fifth group and the fourth group a beam splitter (R19, R20) is arranged so as to lead the light beam toward the view finder optical system.

Below, the aforementioned relations will be explained.

The relation (1) $(0.9 < (R2/R3) < 1)$ is the condition for decreasing the spherical aberration taking place in the first group.

The present invention is intended to obtain a further large compensation effect by introducing a comparatively large air space between the negative meniscus lens and the bi-convex lens. However, when (R2/R3) in the relation (1) is equal to or larger than 1, the divergence factor of the air lens formed between the lens surfaces R2 and R3 becomes weak so that the spherical aberration of the first group becomes large in such a manner that the spherical aberration at the end of the telephoto side due to zooming is under-compensated. On the other hand, when (R2/R3) in the relation (1) is equal to or smaller than 0.9, the divergence factor of the air lens becomes too strong in such a manner that the spherical aberration is over-compensated.

The relation (2) $(0.04F1 < D2 < 0.06F1)$ is the one essential for setting the principal point of the first group comparatively backwards. Hereby, when the distance between the planes is choosen large, the lens arrangement is more of the retrofocus type in such a manner that the principal point can be set behind the lens group. However, when the distance between the surfaces is chosen too large, the axial light beam incident upon the lens surface R3 at the end of the telephoto side becomes high so that the spherical aberration of the higher degree becomes remarkable. Consequently, the upper limit is the condition for preventing the spherical aberration of the higher order of the first group, while the lower limit is condition for preventing the increase of the diameter of the front lens due to the increase of the distance between the principal point of the first group and that of the second group.

The relation (3) $(0.6F1 < R5 < 0.7F1)$ is the condition for obtaining a proper balance between the paraxial aberration at the wide angle side and that at the telephoto side, whereby when R5 is equal to or larger than 0.7F1 the astigmatism at the wide angle side increases, while when R5 is equal to or smaller than 0.6F1 the astigmatism at the telephoto side increases so that it becomes difficult to realize a zoom lens with large aperture and large magnification variation range.

The relation (4) $(3|F2| < R7 < 4|F2|)$ is the condition for checking the distortion and the coma during zooming, whereby the first group is constituted so as to satisfy the relations (1), (2), and (3) so that the diameter of the lens surface R7 can be chosen in such a manner that a profitable form for checking the fluctuation of the distortion can be obtained. However, when R7 is equal to or smaller than the lower limit, the coma becomes remarkable, while when R7 is equal to or larger than the upper limit, the fluctuation of the distance becomes large.

The relation (5) $(0.1 < N1 - (N2 + N3)/2 < 0.21)$ is the condition for preventing the increase of the Petzval's sum along the negative direction by choosing the refractive power of the negative lens in the first group larger than that of the positive lens. When $N1-(N2+N3)/2$ is equal to or smaller than 0.1, the compensation by other parts becomes difficult while when $N-(N2+N3)/2$ is equal to or larger than 0.21, the refractive power of the positive lens becomes to small so that the curvature of every lens becomes large and much more aberrations of higher order take place in such a manner that the fluctuation of the aberration due to zooming becomes large.

The relation (6) $(25 < (\nu2+\nu3)/2 - \nu1 < 40)$ is the condition for compensating the chromatic aberration of the first group. When $(\nu2+\nu3)/2 - \nu1$ is equal to or smaller than the lower limit, the chromatic aberration is under-compensated, while when $(\nu2+\nu3)/2-\nu1$ is equal to or larger than the upper limit the glass properties required to satisfy the relations (5) and (6) exceed those of the conventional optical glasses.

Below, several embodiments will be given with numerical figures. FIG. 1 shows the first embodiment. The spherical aberration, the coma, the curvature of field and the distortion at the end of the wide angle side, the middle picture angle and the end of the telephoto side are shown respectively in FIGS. 4A-4C, FIGS. 5A-5C and FIGS. 6A-6C. FIG. 2 shows the second embodiment and FIG. 3 shows the third embodiment. Hereby, R represents the radius of the lens surface, D the lens thickness and the air distance, Ni the refractive power and $\nu i$ the Abbe numer. Further, f represents the focal length, while F No. represents the F number and $2\omega$ is the field angle.

| Embodiment 1 | | | | |
|---|---|---|---|---|
| f = 1–7.6098 F No. 1:1.4 2ω = 50°–7° | | | | |
| Plane No. | R | D | | |
| 1 | 14.263 | 0.390 | N1 = 1.80518 | V1 = 25.4 |
| 2 | 6.420 | 0.481 | | |
| 3 | 6.884 | 1.471 | N2 = 1.60311 | V2 = 60.7 |
| 4 | −18.021 | 0.013 | | |
| 5 | 5.693 | 0.847 | N3 = 1.60311 | V3 = 60.7 |
| 6 | 12.120 | variable | | |
| 7 | 6.409 | 0.130 | N4 = 1.66672 | V4 = 48.3 |
| 8 | 1.837 | 0.640 | | |
| 9 | −2.529 | 0.130 | N5 = 1.66672 | V5 = 48.3 |
| 10 | 2.180 | 0.462 | N6 = 1.80518 | V6 = 25.4 |
| 11 | 37.960 | variable | | |
| 12 | −3.071 | 0.130 | N7 = 1.62299 | V7 = 58.2 |
| 13 | 5.456 | 0.243 | N8 = 1.80518 | V8 = 25.4 |
| 14 | 20.375 | variable | | |
| 15 | −13.911 | 0.335 | N9 = 1.60311 | V9 = 60.7 |
| 16 | −3.312 | 0.013 | | |
| 17 | 10.060 | 0.338 | N10 = 1.60311 | V10 = 60.7 |
| 18 | −9.495 | 0.130 | | |
| 19 | ∞ | 1.430 | N11 = 1.51633 | V11 = 64.1 |
| 20 | ∞ | 0.780 | | |
| 21 | 2.729 | 0.393 | N12 = 1.62299 | V12 = 58.2 |
| 22 | 16.236 | 0.013 | | |
| 23 | 1.483 | 0.542 | N13 = 1.62299 | V13 = 58.2 |
| 24 | 2.938 | 0.233 | N14 = 1.80518 | V14 = 25.4 |
| 25 | 1.060 | 0.847 | | |
| 26 | −1.404 | 0.189 | N15 = 1.80518 | V15 = 25.4 |
| 27 | 5.718 | 0.414 | N16 = 1.65844 | V16 = 50.9 |
| 28 | −1.994 | 0.229 | | |
| 29 | 24.862 | 0.353 | N17 = 1.60342 | V17 = 38.0 |
| 30 | −2.808 | 0.013 | | |
| 31 | 2.852 | 0.330 | N18 = 1.62004 | V18 = 36.3 |
| 32 | −30.748 | 0.156 | | |
| 33 | ∞ | 0.884 | N19 = 1.63854 | V19 = 55.4 |
| 34 | ∞ | | | |

| Variable Distance | | | |
|---|---|---|---|
| f | 1.000 | 3.444 | 7.609 |
| d6 | 0.181 | 3.613 | 4.856 |
| d11 | 5.056 | 1.195 | 0.381 |

-continued

Embodiment 1
f = 1-7.6098 F No. 1:1.4 2ω = 50°-7°

| | | | |
|---|---|---|---|
| d14 | 0.296 | 0.725 | 0.296 |

F1 = 8.6346
R2/R3 = 0.9326
R5 = 0.6593f1
F2 = -1.9512
D2 = 0.0558f1
R7 = 3.2849 |fII|

$$N1 - \frac{N2 + N3}{2} = 0.2021$$

$$\frac{V2 + V3}{2} - V1 = 35.3$$

Embodiment 2
f = 1.0-7.6098 F No. 1:14 2ω = 50°-7°

| Plane No. | R | D | | |
|---|---|---|---|---|
| 1 | 16.416 | 0.390 | N1 = 1.80518 | V1 = 25.4 |
| 2 | 6.429 | 0.425 | | |
| 3 | 6.874 | 1.508 | N2 = 1.60311 | V2 = 60.7 |
| 4 | -15.622 | 0.013 | | |
| 5 | 5.451 | 0.780 | N3 = 1.69350 | V3 = 53.3 |
| 6 | 9.716 | variable | | |
| 7 | 6.002 | 0.130 | N4 = 1.71300 | V4 = 53.9 |
| 8 | 1.894 | 0.650 | | |
| 9 | -2.531 | 0.130 | N5 = 1.66672 | V5 = 48.3 |
| 10 | 2.308 | 0.448 | N6 = 1.80518 | V6 = 25.4 |
| 11 | 41.498 | variable | | |
| 12 | -2.986 | 0.130 | N7 = 1.62299 | V7 = 58.2 |
| 13 | 5.767 | 0.247 | N8 = 1.80518 | V8 = 25.4 |
| 14 | 25.004 | variable | | |
| 15 | -12.019 | 0.325 | N9 = 1.60311 | V9 = 60.7 |
| 16 | -3.274 | 0.013 | | |
| 17 | 11.249 | 0.325 | N10 = 1.60311 | V10 = 60.7 |
| 18 | -8.116 | 0.130 | | |
| 19 | ∞ | 1.430 | N11 = 1.51633 | V11 = 64.1 |
| 20 | ∞ | 0.780 | | |
| 21 | 2.347 | 0.650 | N12 = 1.60311 | V12 = 60.7 |
| 22 | -7.689 | 0.105 | | |
| 23 | -3.919 | 0.131 | N13 = 1.80518 | V13 = 25.4 |
| 24 | 5.936 | 1.320 | | |
| 25 | 7.076 | 0.516 | N14 = 1.62374 | V14 = 47.1 |
| 26 | -2.974 | 0.085 | | |
| 27 | 3.487 | 0.352 | N15 = 1.62374 | V15 = 47.1 |
| 28 | -12.721 | 0.153 | | |
| 29 | -2.885 | 0.130 | N16 = 1.80518 | V16 = 25.4 |
| 30 | -15.663 | 0.163 | | |
| 31 | ∞ | 0.884 | N17 = 1.63854 | V17 = 55.4 |
| 32 | ∞ | | | |

| Variable Distance | | | |
|---|---|---|---|
| f | 1.000 | 3.444 | 7.609 |
| d6 | 0.252 | 3.683 | 4.927 |
| d11 | 5.068 | 1.207 | 0.393 |
| d14 | 0.283 | 0.712 | 0.283 |

F1 = 8.6346
F2 = -1.9512
R2/R3 = 0.9353
D2 = 0.0493f1
R5 = 0.6314f1
R7 = 3.0760 |fII|

$$N1 - \frac{N2 + N3}{2} = 0.1569$$

$$\frac{V2 + V3}{2} - V1 = 31.6$$

Embodiment 3
f = 1.0-7.6097 F No. 1:1.4 2ω = 50°-7°

| Plane No. | R | D | | |
|---|---|---|---|---|
| 1 | 14.306 | 0.364 | N1 = 1.80518 | V1 = 25.4 |
| 2 | 6.179 | 0.409 | | |
| 3 | 6.639 | 1.430 | N2 = 1.60311 | V2 = 60.7 |
| 4 | -15.984 | 0.013 | | |
| 5 | 5.119 | 0.689 | N3 = 1.60311 | V3 = 60.7 |
| 6 | 10.986 | variable | | |
| 7 | 6.339 | 0.130 | N4 = 1.74400 | V4 = 44.8 |
| 8 | 1.766 | 0.604 | | |
| 9 | -2.332 | 0.130 | N5 = 1.65844 | V5 = 50.9 |
| 10 | 2.332 | 0.429 | N6 = 1.80518 | V6 = 25.4 |
| 11 | -206.861 | variable | | |
| 12 | -2.838 | 0.117 | N7 = 1.69350 | V7 = 53.3 |
| 13 | 10.546 | 0.195 | N8 = 1.80518 | V8 = 25.4 |
| 14 | -79.901 | variable | | |
| 15 | -19.296 | 0.260 | N9 = 1.60311 | V9 = 60.7 |
| 16 | -4.609 | 0.013 | | |
| 17 | 6.787 | 0.364 | N10 = 1.60311 | V10 = 60.7 |
| 18 | -6.787 | 0.130 | | |
| 19 | ∞ | 1.430 | N11 = 1.51633 | V11 = 64.1 |
| 20 | ∞ | 0.806 | | |
| 21 | 3.599 | 0.399 | N12 = 1.60311 | V12 = 60.7 |
| 22 | 349.668 | 0.024 | | |
| 23 | 4.403 | 0.411 | N13 = 1.60311 | V13 = 60.7 |
| 24 | -17.035 | 0.110 | | |
| 25 | -4.185 | 0.130 | N14 = 1.80518 | V14 = 25.4 |
| 26 | 7.739 | 1.434 | | |
| 27 | 9.492 | 0.444 | N15 = 1.64850 | V15 = 53.0 |
| 28 | -2.812 | 0.019 | | |
| 29 | 3.441 | 0.380 | N16 = 1.63636 | V16 = 35.4 |
| 30 | -5.820 | 0.052 | | |
| 31 | -3.074 | 0.130 | N17 = 1.80518 | V17 = 25.4 |
| 32 | 11.022 | 0.087 | | |
| 33 | ∞ | 0.884 | N18 = 1.63854 | V18 = 55.4 |
| 34 | ∞ | | | |

| Variable Distance | | | |
|---|---|---|---|
| f | 1.000 | 3.436 | 7.609 |
| D6 | 0.246 | 3.449 | 4.610 |
| D11 | 4.770 | 1.168 | 0.406 |
| D14 | 0.330 | 0.730 | 0.330 |

F1 = 8.0156
F2 = -1.8211
R2/R3 = 0.9308
D2 = 0.0511f1
R5 = 0.6387f1
R7 = 3.4813 |fII|

$$N1 - \frac{N2 + N3}{2} = 0.2021$$

$$\frac{V2 + V3}{2} - V1 = 35.3$$

What is claimed is:

1. A large aperture zoom lens comprising:
a first lens group for focusing with positive refractive power consisting of a negative meniscus lens whose convex surface is directed toward the object, a bi-convex lens and a positive meniscus lens whose convex surface is directed toward the object;
a second lens group for variation, said second lens group being positioned at the image side of the first lens group and consisting of a negative meniscus lens whose convex surface is directed toward the object and a negative lens constituted of a negative lens and a positive lens cemented with each other;
a third lens group with a negative refractive power movable forward and backward for compensation and positioned at the image side of the second lens group; and
a basic lens group positioned at the image side of the third lens group;
whereby the distance D2 between the negative meniscus lens where F1 represents the focal length of the first group and the bi-convex lens in the first lens group is represented by 0.04F1<D2<0.06F1, while an air lens with divergent effect is formed between the rear surface of the negative meniscus lens and the front surface of the bi-convex lens in the first lens group;

the third lens group consisting of a bi-concave lens and a positive lens cemented with each other;

the basic lens consisting of a sub-group for collimating the beam coming from the third lens group and an image forming lens;

whereby the relations $$0.9 < \frac{R2}{R3} < 1$$

$$0.6F1 < R5 < 0.7F1$$

$$3|F2| < R7 < 4|F2|$$

$$0.1 < N1 - \frac{N2 + N3}{2} < 0.21$$

$$25 < \frac{\nu2 + \nu3}{2} - \nu1 < 40$$

are satisfied, in which relation, R2 represents the radius of curvature of the image side surface of the negative meniscus lens in the first group, R3 is the radius of curvature of the object side surface of the bi-convex lens in the first group, D2 represents the distance between the negative meniscus lens and the bi-convex lens in the first group along the optical axis, R5 is the radius of an object side surface of the positive meniscus lens in the first group, R7 represents the radius of curvature of the first surface convex to the object in the second group, N1 and $\nu$1 are the refractive power and the Abbe number of the negative meniscus lens in the first group with reference to the d line, N2 and $\nu$2 are the refractive power and the Abbe number of the bi-convex lens in the first group with reference to the d line, N3 and $\nu$3 represent the refractive power and the Abbe number of the positive meniscus lens in the first group with reference to the d line, F1 is the focal length of the first group and F2 represents the focal length of the second group.

2. A large aperture zoom lens comprising:

a first lens group for focusing with positive refractive power consisting of a negative meniscus lens whose convex surface is directed toward the object, a bi-convex lens and a positive meniscus lens whose convex surface is directed toward the object;

a second lens group for variation, said second lens group being positioned at the image side of the first lens group and consisting of a negative meniscus lens whose convex surface is directed toward the object and a negative lens constituted of a negative lens and a positive lens cemented with each other;

a third lens with a negative refractive power movable forward and backward for compensation and positioned at the image side of the second lens group; and a basic lens group positioned at the image side of the third lens group;

said zoom lens having the following values:

| f = 1–7.6098  F No. 1:1.4  2ω= 50°–7° | | | | |
|---|---|---|---|---|
| Plane No. | R | D | | |
| 1 | 14.263 | 0.390 | N1 = 1.80518 | V1 = 25.4 |
| 2 | 6.420 | 0.481 | | |
| 3 | 6.884 | 1.471 | N2 = 1.60311 | V2 = 60.7 |
| 4 | −18.021 | 0.013 | | |
| 5 | 5.693 | 0.847 | N3 = 1.60311 | V3 = 60.7 |
| 6 | 12.120 | variable | | |
| 7 | 6.409 | 0.130 | N4 = 1.66672 | V4 = 48.3 |
| 8 | 1.837 | 0.640 | | |
| 9 | −2.529 | 0.130 | N5 = 1.66672 | V5 = 48.3 |
| 10 | 2.180 | 0.462 | N6 = 1.80518 | V6 = 25.4 |
| 11 | 37.960 | variable | | |
| 12 | −3.071 | 0.130 | N7 = 1.62299 | V7 = 58.2 |
| 13 | 5.456 | 0.243 | N8 = 1.80518 | V8 = 25.4 |
| 14 | 20.375 | variable | | |
| 15 | −13.911 | 0.335 | N9 = 1.60311 | V9 = 60.7 |
| 16 | −3.312 | 0.013 | | |
| 17 | 10.060 | 0.338 | N10 = 1.60311 | V10 = 60.7 |
| 18 | −9.495 | 0.130 | | |
| 19 | ∞ | 1.430 | N11 = 1.51633 | V11 = 64.1 |
| 20 | ∞ | 0.780 | | |
| 21 | 2.729 | 0.393 | N12 = 1.62299 | V12 = 58.2 |
| 22 | 16.236 | 0.013 | | |
| 23 | 1.483 | 0.542 | N13 = 1.62299 | V13 = 58.2 |
| 24 | 2.938 | 0.233 | N14 = 1.80518 | V14 = 25.4 |
| 25 | 1.060 | 0.847 | | |
| 26 | −1.404 | 0.189 | N15 = 1.80518 | V15 = 25.4 |
| 27 | 5.718 | 0.414 | N16 = 1.65844 | V16 = 50.9 |
| 28 | −1.994 | 0.229 | | |
| 29 | 24.862 | 0.353 | N17 = 1.60342 | V17 = 38.0 |
| 30 | −2.808 | 0.013 | | |
| 31 | 2.852 | 0.330 | N18 = 1.62004 | V18 = 36.3 |
| 32 | −30.748 | 0.156 | | |
| 33 | ∞ | 0.884 | N19 = 1.63854 | V19 = 55.4 |
| 34 | ∞ | | | |

| | Variable Distance | | |
|---|---|---|---|
| f | 1.00 | 3.444 | 7.609 |
| d6 | 0.181 | 3.613 | 4.856 |
| d11 | 5.056 | 1.195 | 0.381 |
| d14 | 0.296 | 0.725 | 0.296 | where

R: radius of curvature of each refractice surface

D: axial thickness of air space of each lens

N: refractive index of glass composing each lens $\nu$: Abbe number of glass composing each lens.

3. A large aperture zoom lens comprising:

a first lens group for focusing with positive refractive power consisting of a negative meniscus lens whose convex surface is directed toward the object, a bi-convex lens and a positive meniscus lens whose convex surface is directed toward the object;

a second lens group for variation, said second lens group being positioned at the image side of the first lens group and consisting of a negative meniscus lens whose convex surface is directed toward the object and a negative lens constituted of a negative lens and a positive lens cemented with each other;

a third lens with a negative refractive power movable forward and backward for compensation and positioned at the image side of the second lens group; and a basic lens group positioned at the image side of the third lens group;

said zoom lens having the following values:

| f = 1.0–7.6098  F No. 1:14  2ω = 50°–7° | | | | |
|---|---|---|---|---|
| Plane No. | R | D | | |
| 1 | 16.416 | 0.390 | N1 = 1.80513 | V1 = 25.4 |
| 2 | 6.429 | 0.425 | | |
| 3 | 6.874 | 1.508 | N2 = 1.60311 | V2 = 60.7 |
| 4 | −15.622 | 0.013 | | |
| 5 | 5.451 | 0.780 | N3 = 1.69350 | V3 = 63.3 |
| 6 | 9.716 | variable | | |
| 7 | 6.002 | 0.130 | N4 = 1.71300 | V4 = 53.9 |

-continued

| | f = 1.0-7.6098  F No. 1:14  2ω = 50°-7° | | | |
|---|---|---|---|---|
| 8 | 1.894 | 0.650 | | |
| 9 | −2.531 | 0.130 | N5 = 1.66672 | V5 = 48.3 |
| 10 | 2.303 | 0.448 | N6 = 1.80518 | V6 = 25.4 |
| 11 | 41.498 | variable | | |
| 12 | −2.986 | 0.130 | N7 = 1.62299 | V7 = 58.2 |
| 13 | 5.767 | 0.247 | N8 = 1.80518 | V8 = 25.4 |
| 14 | 25.004 | variable | | |
| 15 | −12.019 | 0.325 | N9 = 1.60311 | V9 = 60.7 |
| 16 | −3.274 | 0.013 | | |
| 17 | 11.249 | 0.325 | N10 = 1.60311 | V10 = 60.7 |
| 18 | −8.116 | 0.130 | | |
| 19 | ∞ | 1.430 | N11 = 1.51633 | V11 = 64.1 |
| 20 | ∞ | 0.780 | | |
| 21 | 2.347 | 0.650 | N12 = 1.60311 | V12 = 60.7 |
| 22 | −7.689 | 0.105 | | |
| 23 | −3.919 | 0.131 | N13 = 1.80518 | V13 32 25.4 |
| 24 | 5.936 | 1.320 | | |
| 25 | 7.076 | 0.516 | N14 = 1.62374 | V14 = 47.1 |
| 26 | −2.974 | 0.085 | | |
| 27 | 3.487 | 0.352 | N15 = 1.62374 | V15 = 47.1 |
| 28 | −12.721 | 0.153 | | |
| 29 | −2.885 | 0.130 | N16 = 1.80518 | V16 = 25.4 |
| 30 | −15.663 | 0.163 | | |
| 31 | ∞ | 0.884 | N17 = 1.63854 | V17 = 55.4 |
| 32 | ∞ | | | |

| Variable Distance | | | |
|---|---|---|---|
| f | 1.000 | 3.444 | 7.609 |
| d6 | 0.252 | 3.683 | 4.927 |
| d11 | 5.068 | 1.207 | 0.393 |
| d14 | 0.283 | 0.712 | 0.283 | where
R: radius of curvature of each refractice surface
D: axial thickness of air space of each lens
N: refractive index of glass composing each lens
$v$: Abbe number of glass composing each lens.

4. A large aperture zoom lens comprising:
a first lens group for focusing with positive refractive power consisting of a negative meniscus lens whose convex surface is directed toward the object, a bi-convex lens and a positive meniscus lens whose convex surface is directed toward the object;
a second lens group for variation, said second lens group being positioned at the image side of the first lens group and consisting of a negative meniscus lens whose convex surface is directed toward the object and a negative lens constituted of a negative lens and a positive lens cemented with each other;
a third lens with a negative refractive power movable forward and backward for compensation and positioned at the image side of the second lens group; and
a basic lens group positioned at the image side of the third lens group;
said zoom lens having the following values:

| | f = 1.0-7.6097  F No. 1:1.4  2ω = 50°-70° | | | |
|---|---|---|---|---|
| Plane No. | R | D | | |
| 1 | 14.306 | 0.364 | N1 = 1.80518 | V1 = 25.4 |
| 2 | 6.179 | 0.409 | | |
| 3 | 6.639 | 1.430 | N2 = 1.60311 | V2 = 60.7 |
| 4 | −15.984 | 0.013 | | |
| 5 | 5.119 | 0.689 | N3 = 1.60311 | V3 = 60.7 |
| 6 | 10.986 | variable | | |
| 7 | 6.339 | 0.130 | N4 = 1.74400 | V4 = 44.8 |
| 8 | 1.766 | 0.604 | | |
| 9 | −2.332 | 0.130 | N5 = 1.65844 | V5 = 50.9 |
| 10 | 2.332 | 0.429 | N6 = 1.80518 | V6 = 25.4 |
| 11 | −206.861 | variable | | |
| 12 | −2.838 | 0.117 | N7 = 1.69350 | V7 = 53.3 |
| 13 | 10.546 | 0.195 | N8 = 1.80518 | V8 = 25.4 |
| 14 | −79.901 | variable | | |
| 15 | −19.296 | 0.260 | N9 = 1.60311 | V9 = 60.7 |
| 16 | −4.609 | 0.013 | | |
| 17 | 6.787 | 0.364 | N10 = 1.60311 | V10 = 60.7 |
| 18 | −6.737 | 0.130 | | |
| 19 | ∞ | 1.430 | N11 = 1.51633 | V11 = 64.1 |
| 20 | ∞ | 0.806 | | |
| 21 | 3.599 | 0.399 | N12 = 1.60311 | V12 = 60.7 |
| 22 | 349.668 | 0.024 | | |
| 23 | 4.403 | 0.411 | N13 = 1.60311 | V13 = 60.7 |
| 24 | −17.035 | 0.110 | | |
| 25 | −4.185 | 0.130 | N14 = 1.80518 | V14 = 25.4 |
| 26 | 7.689 | 1.434 | | |
| 27 | 9.492 | 0.444 | N15 = 1.64850 | V15 = 53.0 |
| 28 | −2.812 | 0.019 | | |
| 29 | 3.441 | 0.380 | N16 = 1.63636 | V16 = 35.4 |
| 30 | −5.820 | 0.052 | | |
| 31 | −3.074 | 0.130 | N17 = 1.80518 | V17 = 25.4 |
| 32 | 11.022 | 0.087 | | |
| 33 | ∞ | 0.884 | N13 = 1.63854 | V18 = 55.4 |
| 34 | ∞ | | | |

| Variable Distance | | | |
|---|---|---|---|
| f | 1.000 | 3.436 | 7.609 |
| D6 | 0.246 | 3.449 | 4.610 |
| D11 | 4.770 | 1.168 | 0.406 |
| D14 | 0.330 | 0.730 | 0.330 | where
R: radius of curvature of each refractice surface
D: axial thickness of air space of each lens
N: refractive index ofglass composing each lens
$v$: Abbe number of glass composing each lens.

where
R: radius of curvature of each refractice surface
D: axial thickness of air space of each lens
N: refractive index of glass composing each lens
$v$: Abbe number of glass composing each lens.

* * * * *